(12) United States Patent
Kikuchi et al.

(10) Patent No.: US 6,283,452 B1
(45) Date of Patent: Sep. 4, 2001

(54) PUSH-PULL CABLE DRIVE UNIT ASSEMBLY

(75) Inventors: Taizo Kikuchi; Toru Namiki, both of Wako; Masayuki Ohta, Gunma-ken; Takao Ochiai; Tatsuaki Uehara, both of Tochigi-ken, all of (JP)

(73) Assignees: Honda Giken Kogyo Kaisha, Tokyo; Mitsuba Corp., Gunma-ken; Yachiyo Kogyo Kabushiki Kaisha, Saitama-ken, all of (JP)

(*) Notice: Subject to any disclaimer, the term of this patent is extended or adjusted under 35 U.S.C. 154(b) by 0 days.

(21) Appl. No.: 09/517,899

(22) Filed: Mar. 3, 2000

(30) Foreign Application Priority Data

Mar. 30, 1999 (JP) .................................................. 11-088300

(51) Int. Cl.[7] .............................. B21F 9/00; B60J 7/057
(52) U.S. Cl. ........................................... 254/229; 296/223
(58) Field of Search .................................. 254/229, 230, 254/241; 296/223

(56) References Cited

U.S. PATENT DOCUMENTS

| 4,272,125 | * | 6/1981 | Bienert et al. ......................... 296/223 |
| 4,659,140 | * | 4/1987 | Fuerst et al. ........................... 296/223 |
| 4,919,005 | * | 4/1990 | Schleicher .............................. 296/223 |
| 6,024,404 | * | 2/2000 | Stallfort et al. ....................... 296/223 |

FOREIGN PATENT DOCUMENTS

| 58-192118 | 12/1983 | (JP) . |
| 5052210 | 3/1993 | (JP) . |

* cited by examiner

Primary Examiner—Emmanuel M. Marcelo

(57) ABSTRACT

Cable guides for keeping the push-pull cable in mesh with a pinion are effectively reinforced by a member connecting the free ends of the cable guides. In particular, even when the cable guides are made of a plastic member, and the push-pull cable drive unit is subjected to high temperature environments, the meshing between the cable and the pinion is ensured. Thus, the present invention provides a stable and reliable operation of the push-pull cable drive unit with a simple and economical arrangement. This arrangement is particulalry useful for automotive sunroofs.

8 Claims, 3 Drawing Sheets

PUSH-PULL CABLE DRIVE UNIT ASSEMBLY

TECHNICAL FIELD

The present invention relates to a push-pull cable drive unit assembly suitable for driving sunroofs and other closure members in various forms of vehicles, and in particular to a push-pull cable drive unit assembly which may include various plastic components such as a casing for a speed reduction unit or an electric motor.

BACKGROUND OF THE INVENTION

In a typical push-pull cable drive unit for use in a sunroof system, a drive pinion meshes with the push-pull cable, and a pair of cable guides are integrally provided in the casing for a speed reduction unit so as to support the cable and maintain the meshing of the pinion with the cable. For instance, refer to Japanese UM laid-open publication No. 58-192118.

Conventionally, the casing for a speed reduction unit was made of metallic material to achieve a desired durability. Such a metallic casing provides a high mechanical strength, but tends to be heavy and difficult to work on. To reduce weight and simplify the process of working the casing to a desired shape, it is desirable to form the casing of a speed reduction unit with plastic material.

In a sunroof system using a push-pull cable drive unit for converting a rotary motion into a linear motion, as shown in FIG. 4, a pair of runs of a push-pull cable 6 mesh with a pinion 5 which is connected to an electric motor via a speed reduction unit, and the rotation of the pinion 5 causes the two sections of the push-pull cable 6 to be driven longitudinally in opposite directions. The resulting longitudinal motion of the push-pull cable 6 is transmitted to the sunroof to effect the desired movement of the sunroof although it is not shown in the drawings. The force which the gear teeth of a pinion 5 applies to the cable 6 includes a longitudinal component which is effective in driving the push-pull cable 6. The force also includes a lateral component which urges the cable 6 away from the gear teeth as indicated by FX in FIG. 4. This component is not directly useful for driving the cable 6, and tends to push the two runs of the push-pull cable 6 away from each other. This lateral component is maximized when the cable 6 reaches a mechanical end of its stroke.

To prevent the two runs of the cable 6 from being excessive spread apart and disengaged from the pinion 5, a pair of cable guides 9 are integrally formed as a single piece construction with the casing of the speed reduction unit so as to oppose such a tendency. To achieve this goal, it is essential that the cable guides 9 are provided with an adequate rigidity. Cable guides 9 made of plastic material may not be able to provide an adequate rigidity. It is possible to increase the rigidity by providing ribs to the cable guides, but plastic material tends to be affected by temperature, and may not be able to provide a required rigidity under all conditions.

BRIEF SUMMARY OF THE INVENTION

In view of such problems of the prior art, a primary object of the present invention is to provide a push-pull cable drive unit assembly which employs cable guides made of plastic material but can provide an adequate rigidity under all possible conditions.

A second object of the present invention is to provide a push-pull cable drive unit assembly which is light in weight, and reliable in use.

A third object of the present invention is to provide a push-pull cable drive unit assembly which is easy and economical to manufacture, but durable and stable in use.

According to the present invention, these and other objects can be accomplished by providing a push-pull cable drive unit assembly, comprising: a main assembly integrally incorporated with an electric motor and a speed reduction unit; a pinion projecting from a casing of the main assembly and attached to an output end of the speed reduction unit; a pair of runs of push-pull cable extending parallel to each other and meshing with the pinion at diametrically opposite sides thereof; a pair of cable guides projecting from the casing to support the corresponding runs of the push-pull cable against movement away from each other; and a bridge member placed across the cable guides for restricting movements of free ends of the cable guides away from each other.

Thus, even when the cable guides are made of plastic material, it is possible to ensure an adequate rigidity to the cable guides, and ensure a stable meshing between the pinion and the push-pull cable. In particular, when the cable guides are integrally molded with the casing for the speed reduction unit, a particular significant advantage can be gained in terms of weight reduction and production economy.

The bridge member may include any member such as a plate member or a rod member which joins free ends of the cable guides to restrain movements of the cable guides away from each other. For instance, the bridge member may comprise a pair of holes for receiving free ends of the cable guides, and this arrangement simplifies both the structure for securing the bridge member and the manufacturing process. In this case, the bridge member can be conveniently held in position by being closely received in a bracket. To prevent transmission of vibrations from the main assembly to the bracket, the bridge member may be fitted with a cushioning member so that the contact between the main assembly and the bracket may be made via the cushioning member. Typically, the main assembly is attached to a sunroof frame via the bracket. The bracket may also cover the pinion and the parts of the cable meshing therewith.

It is also possible to eliminate the need for a separate member for joining free ends of the cable guides to restrain movements of the cable guides away from each other by using a bracket having a pair of abutting portions for restricting movements of free ends of the cable guides away from each other. This simplifies the arrangement, and reduces both the material cost and the assembly cost.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
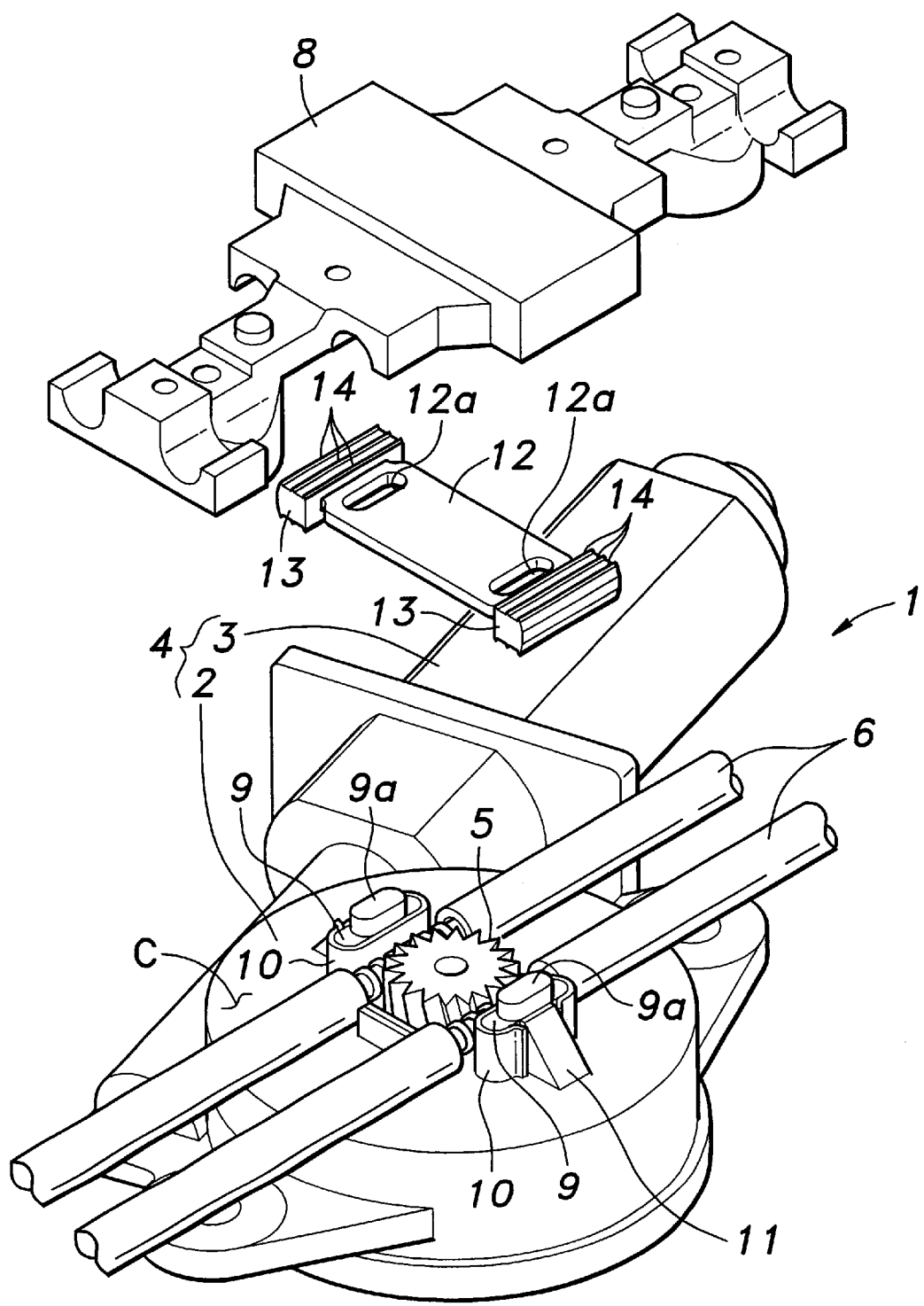
FIG. 1 is an exploded perspective view of a push-pull cable drive unit embodying the present invention.
Figure 2:
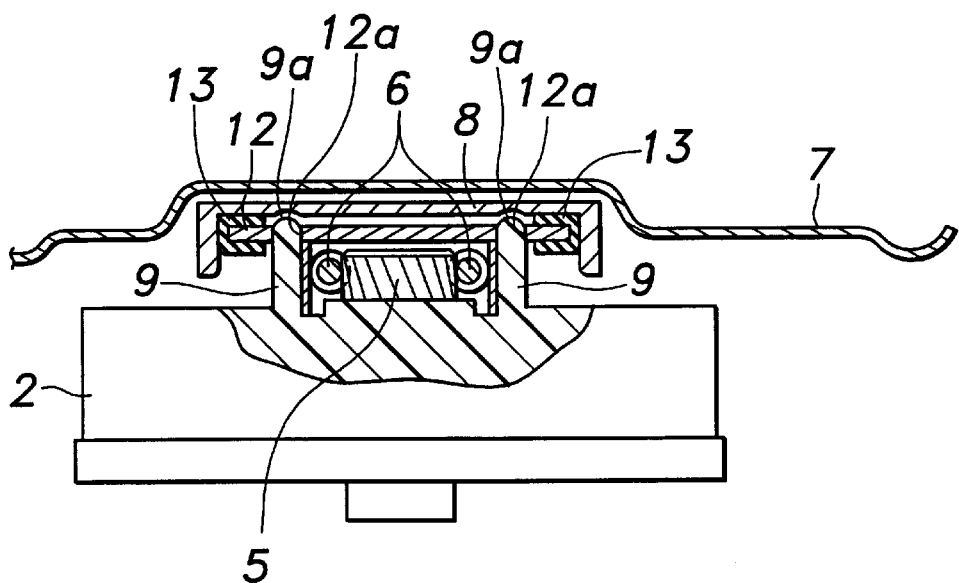
FIG. 2 is a sectional view of the push-pull cable drive unit shown in FIG. 1.

The push-pull cable drive unit 1 shown in FIGS. 1 and 2 comprises a main assembly 4 integrally incorporating a speed reduction unit 2 and an electric motor 3, a pair of runs of push-pull cable 6 meshing with diametrically opposite sides of a pinion 5 which projects from the speed reduction unit 2, and a bracket 8 which covers the parts of the cable meshing with the pinion and attaches the main assembly to a sunroof frame 7 (FIG. 2).

The main assembly 4 includes a casing C made of thermoplastic plastic material. A pair of cable guides 9 integrally project from the upper surface of the casing C to restrict the movement of the cable away from the pinion 5. These cable guides 9 essentially include projections integrally molded as a single piece construction with the casing C, and are each fitted with a shoe 10 made of metallic sheet member to prevent excessive wear of the surface contacting the cable 6.

The outer side of each cable guide 9 is provided with a reinforcing rib 11 which prevents bending deformation of the cable guide 9 away from the cable 6. Free end 9a of each cable guide 9 is fitted into a corresponding one of a pair of holes 12a provided in a bridge member 12. This bridge member 12 is made of a steel plate member, and thus secures the free ends 9a of the cable guides 9 against deformation. Therefore, the bridge member 12 keeps the distance between the two cable guides 9 fixed, and thereby prevents the cable 6 from moving away from the pinion 5. Therefore, the bridge member 12 ensures the cable 6 to be kept meshed with the pinion 5 under all conditions. In this case, the bridge member 12 is held in position by being received in the bracket 8 without requiring any fastening means.

The two ends of the bridge member 12 are each fitted with a damper cap 13 made of a resilient material such as rubber. The surface of each damper cap 13 is provided with a plurality, for instance three, of parallel ridges 14 each having a triangular cross section. The damper caps 13 contact the inner surface of the bracket 8 via these triangular ridges 14. The provision of these damper caps 13 prevents direct contact between the bridge member 12 and the bracket 8 although the bridge member 12 is closely received in the bracket 8 so that the vibrations that may be otherwise transmitted to the bridge member 12 from the main assembly 4 are prevented from being transmitted to the bracket 8.

Figure 3:
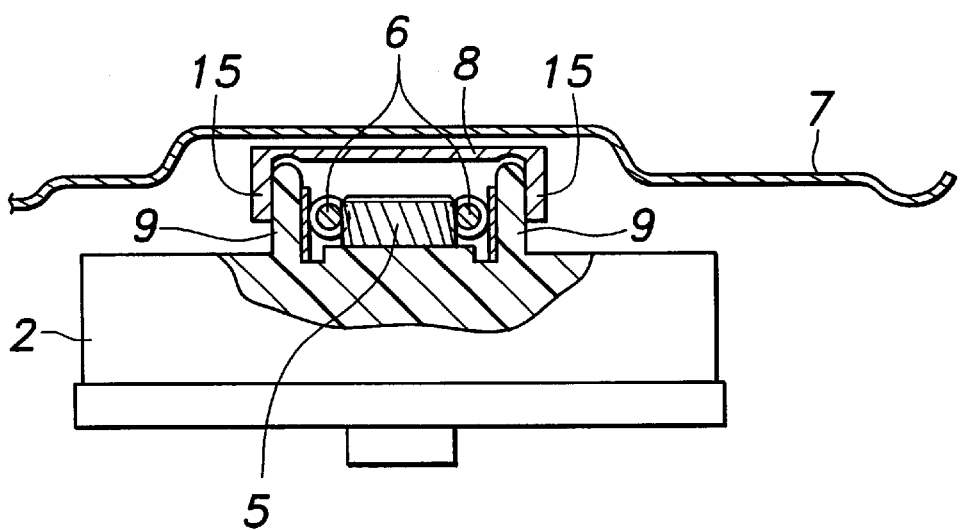
FIG. 3 is a view similar to FIG. 2 showing a second embodiment of the present invention.
Figure 4:
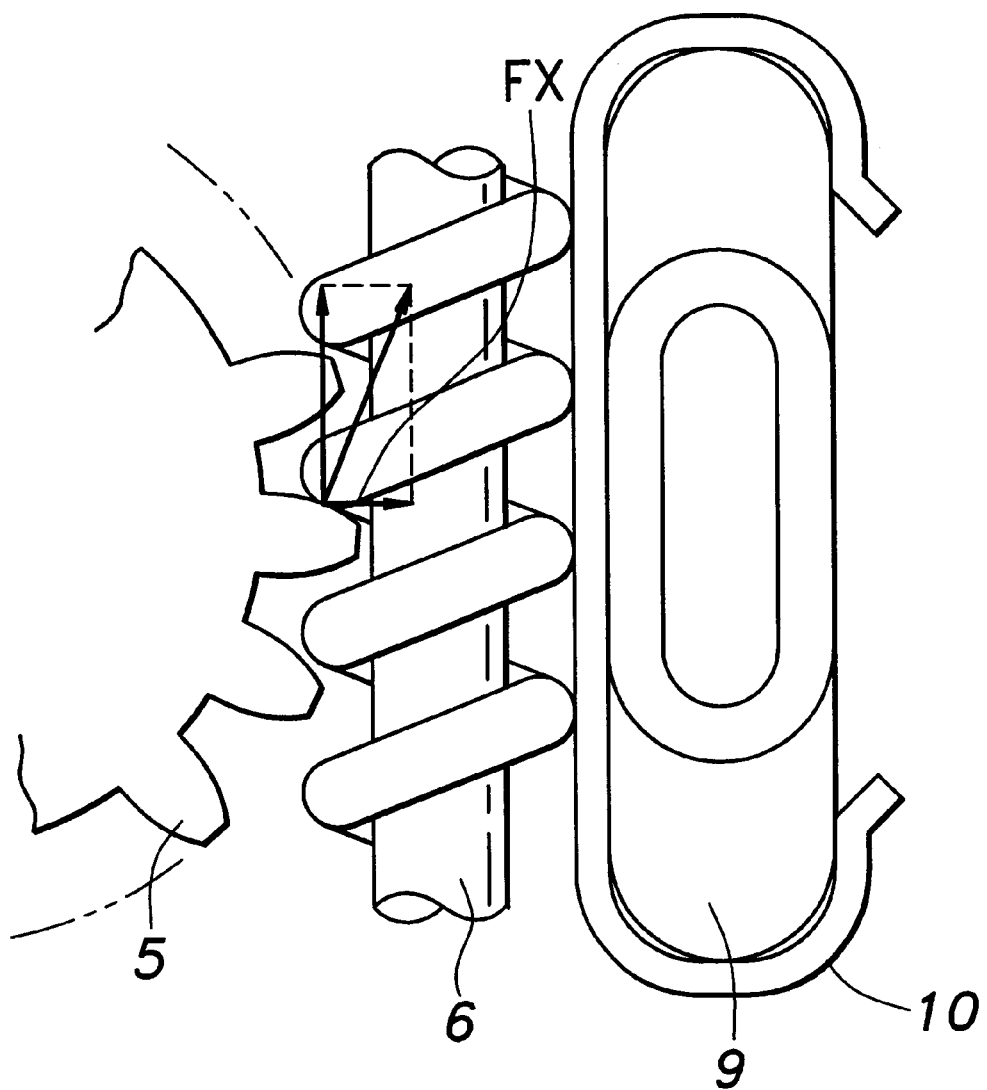
FIG. 4 is a diagram for showing the force acting between the pinion and the push-pull cable.

FIG. 3 shows a second embodiment of the present invention. In this case, the deformation of the cable guides 9 away from each other is prevented by abutting portions 15 integrally formed as a single piece construction with the bracket 8. In this case, the bracket 8 performs the function of the bridge member in the previous embodiment. According to this embodiment, the number of components is reduced, and this contributes to the simplification and cost reduction of the assembly.

Thus, according to the present invention, because the cable guides are effectively reinforced by a member connecting the free ends of the cable guides, the meshing of the cable with the pinion is ensured under all circumstances. The present invention is particularly significant when the cable guides are made of a plastic member, and the push-pull cable drive unit is subjected to high temperature environments.

Thus, the present invention provides a stable and reliable operation of the push-pull cable drive unit with a simple and economical arrangement.

Although the present invention has been described in terms of preferred embodiments thereof, it is obvious to a person skilled in the art that various alterations and modifications are possible without departing from the scope of the present invention which is set forth in the appended claims.

What is claimed is:

1. A push-pull cable drive unit assembly, comprising:

a main assembly integrally incorporated with an electric motor and a speed reduction unit;

a pinion projecting from a casing of said main assembly and attached to an output end of said speed reduction unit;

a pair of runs of push-pull cable extending parallel to each other and meshing with said pinion at diametrically opposite sides thereof;

a pair of cable guides projecting from said casing to support the corresponding runs of said push-pull cable against movement away from each other; and a bridge member placed across said cable guides for restricting movements of free ends of said cable guides away from each other, wherein said bridge member comprises a member connecting free ends of said cable guides.

2. A push-pull cable drive unit assembly according to claim 1, wherein said cable guides each comprise a plastic member integrally molded with said casing for said main assembly.

3. A push-pull cable drive unit assembly according to claim 1, wherein said bridge member further comprises a pair of holes for receiving free ends of said cable guides.

4. A push-pull cable drive unit assembly according to claim 3, wherein said bridge member is fitted with a cushioning member, said bridge member being held in position by being closely received in a bracket via said cushioning member.

5. A push-pull cable drive unit assembly according to claim 4, wherein said bracket is adapted to attach said main assembly to a sunroof frame.

6. A push-pull cable drive unit assembly according to claim 1, wherein said bridge member comprises a bracket having a pair of abutting portions for restricting movements of free ends of said cable guides away from each other.

7. A push-pull cable drive unit assembly according to claim 6, wherein said bracket is adapted to attach said main assembly to a sunroof frame.

8. A push-pull cable drive unit assembly according to claim 1, wherein said cable guides each comprise a plastic member of single piece construction with said casing for said main assembly.

* * * * *